July 7, 1942.  R. M. SQUIRE  2,288,959
NUT LOCKING WASHER
Filed Oct. 19, 1940    2 Sheets-Sheet 1
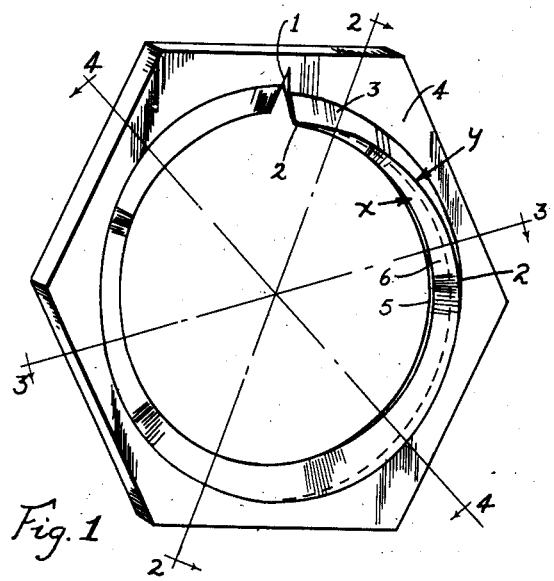
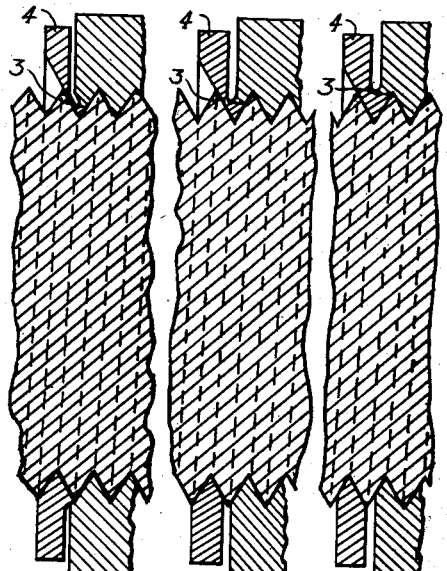
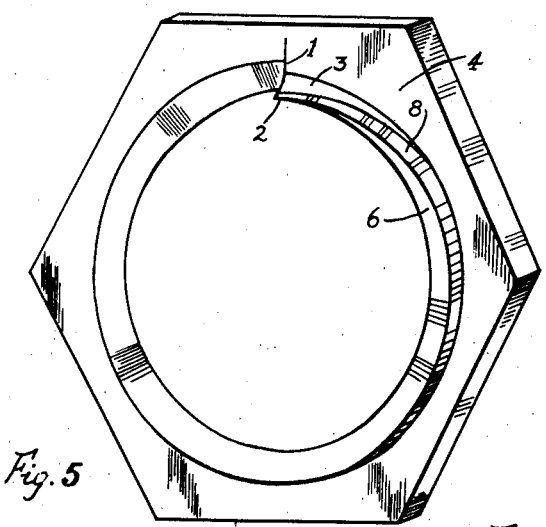
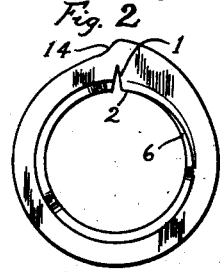
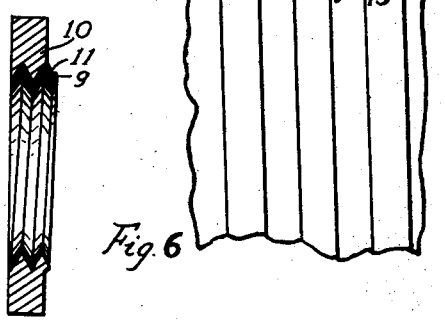
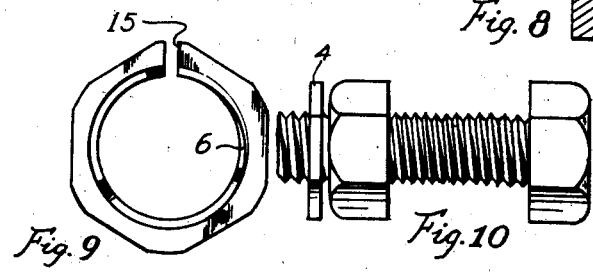
INVENTOR
Ralph M. Squire
BY
ATTORNEY July 7, 1942.  R. M. SQUIRE  2,288,959
NUT LOCKING WASHER
Filed Oct. 19, 1940  2 Sheets-Sheet 2

INVENTOR.
Ralph M. Squire
BY
ATTORNEY

Patented July 7, 1942

2,288,959

UNITED STATES PATENT OFFICE 2,288,959

NUT LOCKING WASHER

Ralph M. Squire, Longview, Wash.

Application October 19, 1940, Serial No. 361,831

11 Claims. (Cl. 151—30)

My invention relates to the locking of threaded nut and bolt elements to prevent relative rotation thereof. The tendency of a nut to rotate with respect to its bolt may be caused, in some cases, by continued jarring or vibration, while in other cases, it may be caused by engagement with a rotating member, such as an idler pulley or the like. This application is a continuation in part of my copending application for patent for a Nut locking device, which issued as United States Patent No. 2,220,356, on November 5, 1940.

Heretofore, locknuts of the type adapted to jam against the nut to be locked have been commonly used for the purpose to which my invention is directed. Said locknuts have, however, been more or less unsatisfactory for this purpose inasmuch as they require considerable force to set them in place and to loosen them when that is desired, they sometimes fail to lock the nut in service, and they are unnecessarily expensive. Because of the unreliability of locknuts, in some types of service it is necessary to use castle nuts and cotter keys which positively prevent rotation of the nut, but which are expensive and require a hole thru the bolt for the cotter key. Also it is extremely difficult, in some cases, to insert the cotter key. Where a nut is drawn firmly against some object, spring type lock washers may be used, but they are undependable under many conditions, and they cannot be used where it is desired to lock a nut at some intermediate point in a bolt, where it is not in contact with any fixed object.

I propose to provide a nut locking washer that will serve the same general purpose as a locknut, but that will function in a materially different way to produce improved results. A locknut functions by exerting force longitudinally of the bolt, against the nut it is to lock. A nut is inherently capable of exerting an enormous force in this direction; its usefulness arises from its ability to exert said force by rotation, the rotative force being small compared to the thrust longitudinally of the bolt. In other words, a nut is adapted to turn easily while exerting a strong force longitudinally of the bolt. Said force is distributed uniformly along the full length of the thread. Thus, even though a nut and a locknut are jammed together until the threads are on the verge of giving way, the two may turn together rather easily, turning most easily when the threads are most perfect.

On the other hand, I propose to lock a nut on its bolt element by means of a force in a direction perpendicular to the bolt; I insert a wedge between the nut and bolt in such a way as to exert a substantial outward radial force on the nut on one side, causing the nut and bolt threads on the opposite side of the nut to mesh to an abnormal depth. In this condition, and with the force exerted by the wedge concentrated in a relatively small spot, the nut will be securely held with only moderate pressure on the wedge.

In the practical application of this apparently simple principle, however, a serious difficulty is encountered in that the aforesaid wedge tends to be carried along with the nut instead of remaining stationary with respect to the bolt, when the nut turns on the bolt. It will be apparent that a nut cannot turn an appreciable amount against a stationary wedge because the radial force exerted by the wedge will be thereby greatly increased, but the wedge may be carried along with the nut without so increasing said force—without locking the nut.

I desire to securely lock a nut by the exertion of only a moderate pressure on the wedge member; I do not wish to produce sufficient initial radial force to hold the nut under all conditions, but I wish to insure that any loosening movement of the nut will of itself so increase said force as effectively to prevent said movement. To this end, I provide a wedge that is adapted to seat firmly in the trough of a nut thread, so that it will not be easily movable therein. Furthermore, and of even greater importance, I so construct said wedge that that portion of the nut thread coming in contact therewith will readily slide upon the wedge instead of pushing it along the bolt thread. I carefully avoid shaping said wedge so that it will make a dent in the nut thread, which has a very thin edge at its point of contact with the wedge, inasmuch as said dent will preclude effective locking of the nut by pushing the wedge ahead of it.

The principal object of my invention is to provide a nut locking device that will lock more securely as the force tending to rotate the nut increases.

A further object of my invention is to provide a nut locking washer in which the wedge member is reinforced to prevent it from buckling while being inserted between a nut and its bolt member. Even when the wedge has been properly designed to minimize the force required to seat it, in some cases it will be desirable to seat it so firmly that it will tend to bend unless supported in some way. This difficulty arises from the fact that a wedge shaped according to my invention will have a rather long taper.

A further object of my invention is to provide a nut locking washer that may be gripped with a wrench to seat or loosen it.

A further object of my invention is to provide a nut locking washer that may be stamped in completed form from sheet metal, this method of manufacture being much cheaper than the cutting of threads.

Other objects and advantages of my invention will be described with reference to the accompanying drawings, in which:

Fig. 1 is a perspective view of a nut locking washer embodying my invention;

Fig. 2 is a fragmentary sectional view of a nut and bolt element with the washer shown in Fig. 1 in place thereon, the section thru the washer being taken on the line 2—2 in Fig. 1;

Fig. 3 is a view similar to Fig. 2 but with the section of the washer being taken along the line 3—3 in Fig. 1;

Fig. 4 is a view similar to Fig. 2 but with the section of the washer being taken along the line 4—4 in Fig. 1;

Fig. 5 is a perspective view of the washer of Fig. 1, being taken from a different direction;

Fig. 6 is a fragmentary sectional view of a modification of my invention in place on a fragmentary bolt element, a portion of a nut being shown in full lines in the position in which it first contacts the washer of my invention and in dotted lines after it has been forced thereon;

Fig. 7 is a plan view of a further modification of my invention having a smooth periphery;

Fig. 8 is a sectional view of the washer shown in Fig. 6;

Fig. 9 is a plan view of a further modification of my invention;

Fig. 10 is a plan view of a washer embodying my invention and a nut and bolt element, said members being shown in a locked position;

Figure 11:
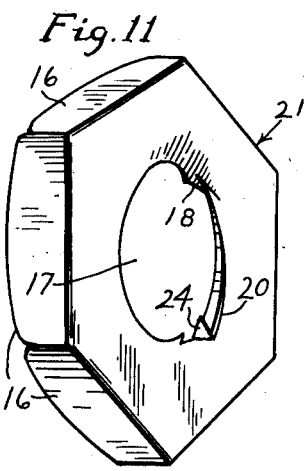
Fig. 11 is a perspective view of a further modification of my invention.
Figure 12:
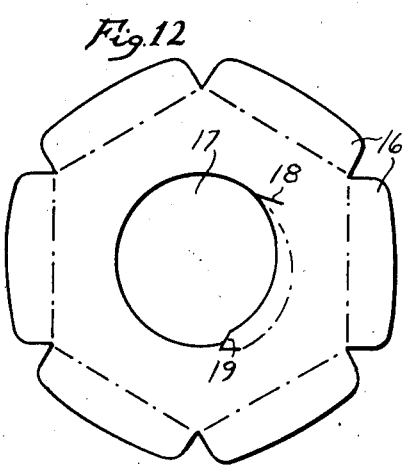
Fig. 12 is a plan view of a blank for producing the structure shown in Fig. 11, the bend lines being shown by broken lines.
Figure 13:
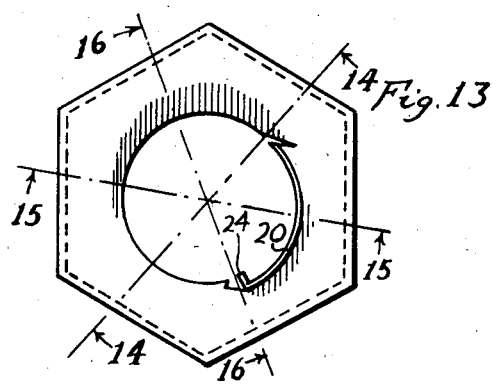
Fig. 13 is a plan view of the structure shown in Fig. 11.

For ordinary service, I prefer to make a nut locking washer in hexagonal form, as is shown in Fig. 1, and to stamp the same out of sheet metal. In order to form a thread in this way, a slit 1 is provided and the edges thereof are offset an amount equal to the lead of the thread to be formed. A wedge or lip member is formed beginning at a more or less sharp point 2 and developing into its full height in about ⅜ of a turn. As may be seen in Figs. 2, 3, and 4, said wedge is substantially triangular in section, varying from a triangle in that a web 3 along one side of its upper face connects said wedge to the body 4 of said washer. A section of said wedge differs from a triangle, furthermore, in that its inner apex is slightly flattened at 5.

Web 3 is preferably extremely thin at its end, being thicker where the wedge begins to merge with the washer. Thus, the slender point end of the wedge is supported and guided properly to enter the nut thread, while the middle portion of the wedge, which might otherwise buckle, is firmly supported by a thicker web. Being extremely thin, the end of the web does not interfere with the tip of the wedge being thrust under a nut thread so far that it underlies a full, rather than a fragmentary, nut thread.

I have observed that, as nuts are ordinarily constructed, the beginning end of the thread is rather thin, forming only one-half the angle of a full thread due to the intersection of the face of the nut therewith, as is shown at 7 in Fig. 6. Thus, a standard thread forms 60° angles at its apices, but an apex is bisected by the face of the nut so that it forms only a 30° angle. This thin portion would reach its full depth in one-half turn except for the fact that threads are ordinarily somewhat flattened at their apices. Therefore, with a standard thread which is flattened by an amount equal to one-eighth the lead of the thread, the nut thread will reach its full radial depth in about three-eighths of a turn. Thus, said thread becomes deeper along an angle having curved sides equal in length to three-eighths of a circumference subtended by a side equal in length to the depth of a thread.

I term this angle, as thus described, the angle of deepening. Referring to Fig. 1, said angle is generated upon the side of the portion of the wedge member 6 from the point 2 thereof to a point thereon approximately ⅜ of the circumference viewed clockwise of the bore where said wedge is full height or depth. It is also the angle which the partial thread makes moving inwardly from the base of the nut until said thread is full depth or height. This is represented in Fig. 1 as the angle between the curved lines $x$ and $y$ from the point 2 to approximately the point 2' shown in said figure. This angle of deepening varies, for United States Standard threads, from about 6° for a ½ inch thread to about 4° for a 2 inch thread. I call this tapered, beginning portion a fragmentary nut thread.

This angle by which a nut thread deepens is of great importance with my invention. I have found that if a wedge is formed with substantially the same angle as the aforesaid angle of deepening of the nut thread, said nut thread will slide along the top of said wedge until it is firmly locked, whereas if said wedge differs materially from said angle it will make a dent in said thin portion of the nut thread and will be thereby pushed along with the nut. I prefer that the wedge portion of my invention shall be substantially complementary to the beginning nut thread, that it shall fill the space left unoccupied by the incomplete thread. The wedge 6 is shaped according to these proportions.

As a further precaution against the wedge being carried along with the nut, instead of remaining stationary with respect to the bolt thread, I make the sides of said wedge of substantially the same angle as the sides of the bolt thread. I then relieve the inner apex of said wedge, forming the flattened portion 5, in order that the sides of the wedge may be firmly seated in said bolt thread, without bearing against the bottom thereof. The two sides of said wedge that engage the bolt threads may be roughened, if desired, to further prevent slippage, while the top face 8 of said wedge should be smooth to facilitate slippage of the nut thread thereon.

When a nut is turned until it makes contact with a wedge made in accordance with my invention, or conversely when said wedge is turned to make contact with said nut, the thin edge of the beginning nut thread will be in contact with the top surface of the wedge for substantially the full length of the thin portion of said thread. Then, if the nut is forced further onto the wedge, said thin edge of the nut thread will be turned over, as is shown in Figs. 2, 3, and 4. As is shown in Fig. 2, after the nut has been forced a substantial amount, the full 60° thread will engage the tip of the wedge, but along the remainder of the wedge contact will be made by the 30° edge.

The aforesaid rolling over of the thin edge of the beginning nut thread is favorable to the functioning of my invention, since a substantial radial force is thereby exerted on the nut, and it is this radial force upon which I rely for the locking of the nut and bolt.

In some types of service, it is necessary that the nut remain stationary while the wedge is inserted under it; it is not permissible to back the nut onto the wedge. It then becomes necessary to exert considerable force longitudinally of the wedge. This presents some difficulty in that it is difficult to grip the wedge with a tool to either insert it under the nut or to remove it therefrom when it is desired to remove the nut. Also, if an attempt to drive the wedge in is made, the wedge may buckle. To provide a means for gripping the wedge with a wrench, as well as to support it, I attach said wedge to the side of a washer. The wedge thus forms a thread for substantially three-eighths of a turn, said wedge then merging into the side of the washer, which forms a continuation of said thread for the remainder of the turn.

The modification of my invention shown in Figs. 6 and 8 provides more than one complete thread for the washer, thus rendering it more stable and easier to thread on a bolt. This construction, however, is somewhat more expensive than that shown in Fig. 1 since the latter may be formed in a punch press, whereas the threads of Fig. 6 must be cut. As shown in Fig. 8, the wedge 9 is connected to body 10 of the washer by web 11. Nut 12 is shown in full lines in the position in which it first engages said wedge; in dotted lines, it is shown after being forced thereon, having the thin edge of its thread turned over. Said wedge has its lower apex 13 flattened so that the pressure of the nut thread wedges it between the bolt threads. It will be understood that while I have shown full V-threads in some views, for convenience, said threads will ordinarily be somewhat flattened in accordance with common practice. But I deem it important to further flatten the wedge, in this case, in order that it shall not rest on the bottom of the bolt thread, but shall wedge against the sides thereof.

In the modification of my invention shown in Fig. 7, the wedge is formed as in the previously described forms, but the periphery of the washer is more or less smooth in order that it will not easily catch on some object and thereby be loosened. A shoulder 14 is provided facing in the proper direction so that a drift may be placed thereon to drive the wedge in place. The modification shown in Fig. 9 differs from that shown in Fig. 1, only in that the washer is split at 15 thereby being adaptable to slight variations in size of thread. Said washer then acts as a spring to grip or clasp the bolt threads.

While I have described my invention as a washer, it will be understood that it functions, in some respects, like a nut, having threads adapted to engage a bolt thread. However, it is not intended to act as an ordinary locknut. As is shown in Figs. 2 to 4 and 6, there should be clearance between the face of the nut and the washer. I do not contemplate the exertion of any force longitudinally of the bolt. All of the force by which the nut and bolt are locked is in a direction radial of the bolt.

The modification of my invention shown in Figs. 11 to 16 is advantageous in that it may readily be stamped from thin sheet metal, this being a cheap production method. It differs from the modifications hereinbefore described in that it may be formed wholly by a bending operation in a punch press; it is not necessary to upset or extrude the metal. Thus, a blank may be punched from a metal sheet in the form shown in Fig. 12, having a plurality of tabs 16 adapted, when bent along the dot-and-dash lines along their bases, to form the faces of the washer, analogous to the faces of a nut.

A hole 17, generally circular in shape, is provided with a slit 18 which I preferably form to make an acute angle with said hole for reasons hereinafter set forth. Another V-shaped slit 19 is provided about three-eighths of the way around the circumference of hole 17. The material lying between said two slits may then be bent outward along the dot-and-dash line between them (Fig. 12) to form the lip 20. The washer 21 thus formed comprises a disc having an outwardly protuberant lip 20 and faces 16, or other suitable means, by which the washer may be grasped and turned against a nut, or held while the nut is turned against it.

Figures 14, 15, 16:
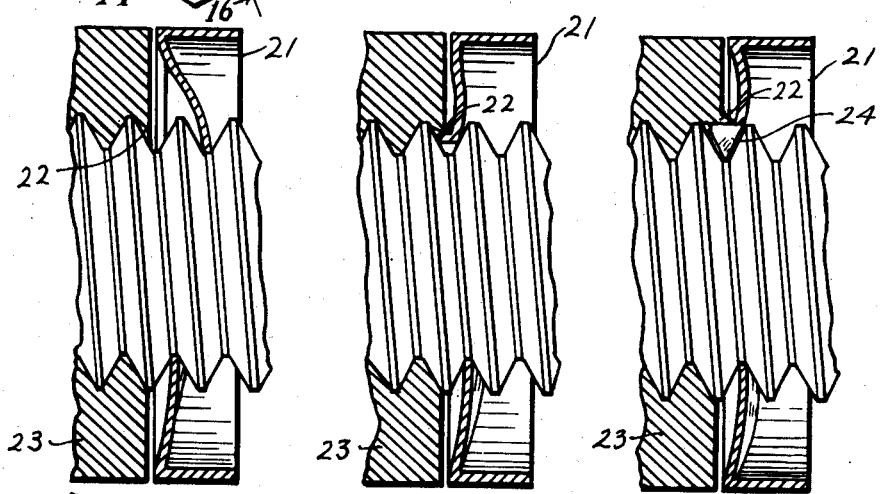
Fig. 14 is a fragmentary sectional view showing the washer of Fig. 11 in place on a nut and bolt element, the section of the washer being taken on the line 14—14 in Fig. 13.
Fig. 15 is a view similar to Fig. 14, the section of the washer being taken on the line 15—15 in Fig. 13.
Fig. 16 is a view similar to Fig. 14, the section of the washer being taken on the line 16—16 in Fig. 13.

Lip 20 functions in the same way as the wedge members hereinbefore described, being merely a flattened form of wedge. It is given the proper taper so that, as it lies in a bolt thread, its outer face corresponds substantially with the face of the beginning nut thread it is to engage. The thin edge of the beginning nut thread 22 is thus readily turned over when the nut 23 is forced on lip 20, as is shown in Figs. 14, 15, and 16.

Particularly with bolt and nut elements that have unusually tight-fitting threads, a difficulty sometimes arises in that, when the nut is forced on the wedge member, or lip, the extreme end of the web portion 3 (Fig. 1) binds against the nut thread. This difficulty is due to the fact that this end portion of web 3 sometimes is thrust under the nut thread until it underlies a full nut thread, rather than the thin, beginning nut thread. I therefore, prefer to make web 3 thin, especially near its end. In the modification of my invention shown in Figs. 11 to 16, I prefer to meet this difficulty by sloping slit 18 so that it makes an acute angle with hole 17. The material corresponding to web 3 is thus largely eliminated.

Inasmuch as lip 20 may preferably be made of rather thin metal, and since said lip must exert a strong radial force on a nut thread in order to lock the nut on a bolt, I prefer to provide a tip 24 to help support said lip. Tip 24 is readily provided by the V-shaped slit 19 hereinbefore described, being of the proper size and shape to seat in a bolt thread and support the broad end of lip 20.

I claim:

1. A nut locking washer for a nut and bolt assembly comprising a body portion adapted to engage a threaded bolt, and a protuberant wedge portion projecting laterally therefrom, said wedge portion being substantially triangular in section and adapted to be inserted between the root of said bolt thread and the spiral crest of that portion of a mutually engaging fragmentary nut thread adjoining the face of the nut, the face of said wedge portion adjacent said crest being tapered to substantial parallelism therewith when the other two faces of said wedge portion are wedged between the sides of said bolt thread.

2. A nut locking washer for a nut and bolt assembly comprising a body portion adapted to engage a threaded bolt, and a protuberant wedge portion projecting laterally therefrom, said wedge portion being substantially triangular in section and adapted to be inserted between the root of said bolt thread and the spiral crest of that portion of a mutually engaging fragmentary nut thread adjoining the face of the nut, said wedge portion being substantially complementary to said fragmentary nut thread to fill a bolt thread groove with which said nut thread engages for substantially the full length of said fragmentary nut thread, thereby to exert substantially only radial force between said bolt and nut.

3. A nut locking washer for a nut and bolt assembly comprising a body portion adapted to engage a threaded bolt, and a protuberant wedge portion projecting laterally therefrom, said wedge portion being substantially triangular in section and adapted to be inserted between the root of said bolt thread and the spiral crest of that portion of a mutually engaging fragmentary nut thread adjoining the face of the nut, the face of said wedge portion adjacent said crest being tapered to substantial parallelism therewith when the other two faces of said wedge portion are wedged between the sides of said bolt thread, said wedge portion being substantially complementary to said fragmentary nut thread to fill a bolt thread groove with which said nut thread engages for substantially the full length of said fragmentary nut thread, thereby to exert substantially only radial force between said bolt and nut.

4. A nut locking washer for a nut and bolt assembly comprising a body portion adapted to engage a threaded bolt in screw-threaded relationship, a protuberant tapered lip projecting therefrom also in screw-threaded relationship with said threaded bolt, said lip thereby being adapted to be inserted between the root of said bolt directed point first and the spiral crest of that portion of a mutually engaging fragmentary nut thread adjoining the face of the nut, thereby to exert radial force between said bolt and nut.

5. A nut locking washer for a nut and bolt assembly comprising a body portion adapted to engage a threaded bolt, a protuberant lip projecting laterally therefrom, said lip being adapted to be inserted between the root of said bolt thread and the spiral crest of that portion of a mutually engaging fragmentary nut thread adjoining the face of the nut, said lip being tapered to lie in said bolt thread in substantial parallelism with said crest when said lip is wedged between the sides of said bolt thread, thereby to exert substantially only radial force between said bolt and nut.

6. A nut locking washer for a nut and bolt assembly comprising a body portion adapted to engage a threaded bolt, a portion of said body being turned outward to form a protuberant tapered lip projecting laterally therefrom, said lip being adapted to be inserted between the root of said bolt thread and the spiral crest of that portion of a mutually engaging fragmentary nut thread adjoining the face of the nut, said lip being tapered to lie in said bolt thread in substantial parallelism with said crest when said lip is wedged between the sides of said bolt thread, thereby to exert substantially only radial force between said bolt and nut.

7. A nut locking washer for a nut and bolt assembly comprising a body portion adapted to engage a threaded bolt, a protuberant lip projecting laterally therefrom, said lip being adapted to be inserted between the root of said bolt thread and the spiral crest of that portion of a mutually engaging fragmentary nut thread adjoining the face of the nut, said nut locking washer being of substantially uniform thickness, being centrally perforated and having a portion along the margin of said perforation defining said lip, one end of said portion being separated from the main portion by a slit making an acute angle with the margin of said perforation.

8. A nut locking washer for a nut and bolt assembly comprising a body portion adapted to engage a threaded bolt, a protuberant lip projecting laterally therefrom, said lip being adapted to be inserted between the root of said bolt thread and the spiral crest of that portion of a mutually engaging fragmentary nut thread adjoining the face of the nut, said lip being tapered to lie in said bolt thread in substantial parallelism with said crest when said lip is wedged between the sides of said bolt thread, thereby to exert radial force between said bolt and nut, said nut locking washer being of substantially uniform thickness, being centrally perforated and having a portion along the margin of said perforation defining said lip, one end of said portion being separated from the main portion by a slit making an acute angle with the margin of said perforation.

9. A nut locking washer for a nut and bolt assembly comprising a body portion adapted to engage a threaded bolt, a protuberant tapered lip projecting laterally therefrom, said lip being adapted to be inserted between the root of said bolt thread and the spiral crest of that portion of a mutually engaging fragmentary nut thread adjoining the face of the nut thereby to exert radial force between said bolt and nut, and a dependent tip at the broad end of said tapered lip adapted to seat in the bolt thread thereby to support said lip.

10. A nut locking washer for a nut and bolt assembly comprising a body portion adapted to engage a threaded bolt, and a protuberant wedge portion projecting laterally therefrom, said wedge portion being substantially triangular in section and adapted to be inserted between the root of said bolt thread and the spiral crest of that portion of a mutually engaging fragmentary nut thread adjoining the face of the nut, said wedge portion being joined to the body portion by a relatively thin web.

11. A nut locking washer for a nut and bolt assembly comprising a body portion adapted to engage a threaded bolt, and a protuberant pointed end wedge portion projecting laterally therefrom, said wedge portion being substantially triangular in section and adapted to be inserted between the root of said bolt thread and the spiral crest of that portion of a mutually engaging fragmentary nut thread adjoining the face of the nut, said wedge portion being joined to the body portion by a relatively thin web tapering to a sharp edge adjacent the pointed end of said wedge portion.

RALPH M. SQUIRE.